US006834535B2

(12) United States Patent
Kano et al.

(10) Patent No.: US 6,834,535 B2
(45) Date of Patent: Dec. 28, 2004

(54) FUEL VAPOR TREATMENT SYSTEM

(75) Inventors: Masao Kano, Gamagori (JP); Yasuhiro Yamashita, Nukata-gun (JP)

(73) Assignee: Denso Corporation (JP)

( * ) Notice: Subject to any disclaimer, the term of this patent is extended or adjusted under 35 U.S.C. 154(b) by 53 days.

(21) Appl. No.: 10/242,440

(22) Filed: Sep. 13, 2002

(65) Prior Publication Data

US 2003/0051541 A1 Mar. 20, 2003

(30) Foreign Application Priority Data

Sep. 17, 2001 (JP) ....................................... 2001-281339

(51) Int. Cl.[7] ............................................... G01M 15/00
(52) U.S. Cl. ........................................ 73/49.7; 73/118.1
(58) Field of Search ................................ 73/40, 46, 47, 73/49.7, 116, 117.2, 117.3, 118.1

(56) References Cited

U.S. PATENT DOCUMENTS 5,146,902 A * 9/1992 Cook et al. ................. 123/518
5,495,749 A * 3/1996 Dawson et al. .............. 73/49.7
5,641,899 A * 6/1997 Blomquist et al. ......... 73/118.1
5,890,474 A 4/1999 Schnaibel et al.
6,202,478 B1 * 3/2001 Blomquist et al. ........... 73/49.7
6,550,318 B2 * 4/2003 Isobe et al. ................ 73/118.1
6,604,407 B2 * 8/2003 Kano et al. .................. 73/49.7
2002/0139173 A1 * 10/2002 Kano et al. .................. 73/49.7
2003/0074958 A1 * 4/2003 Nagasaki et al. .......... 73/118.1
2003/0079533 A1 * 5/2003 Cook et al. ................ 73/118.2
2003/0154770 A1 * 8/2003 Steckler et al. .............. 73/49.7
2003/0192365 A1 * 10/2003 Perry et al. .................. 73/49.7

* cited by examiner

*Primary Examiner*—Eric S. McCall
(74) *Attorney, Agent, or Firm*—Nixon & Vanderhye PC

(57) ABSTRACT

A pressure-changing device of a leak check system for a fuel vapor treatment system has a pressure chamber formed in a peripheral space of a communicating path connecting a pump with an electromagnetic valve, the pressure chamber being deviated from flow delivered by the pump. The electromagnetic valve is opened to connect the communicating path with a canister. Then, a purge valve is closed and the pump is turned on to change pressure in a fuel vapor path. A pressure sensor attached on a side wall of the pressure chamber detects pressure in the communicating path to determine pressure in the fuel vapor path. The leak check system judges existence of leak in the fuel vapor treatment system from pressure in the fuel vapor path.

13 Claims, 8 Drawing Sheets

FUEL VAPOR TREATMENT SYSTEM

CROSS REFERENCE TO RELATED APPLICATION

This application is based on and incorporates herein by reference Japanese Patent Application No. 2001-281339 filed Sep. 17, 2001.

BACKGROUND OF THE INVENTION

1. Field of the Invention

The present invention relates to a pressure-changing device for a leak check system that checks for leaks in a fuel vapor treatment system by changing the pressure in the fuel vapor treatment system.

2. Description of Related Art

Conventionally, a known fuel vapor treatment system adsorbs fuel vapor forming in a fuel tank with adsorbent such as granulated active carbon contained in an adsorption vessel. The fuel vapor treatment system discharges the adsorbed fuel vapor into a suction pipe by negative pressure in the suction pipe. The fuel vapor treatment system should be checked for leaks because if it has a leak, the fuel vapor flows out to the environment. A known leak check system for the fuel vapor treatment system delivers air into the adsorption vessel with a pump to pressurize a fuel vapor path in the fuel treatment system. The fuel vapor path is a path through which the fuel vapor flows. A pressure sensor disposed in the fuel tank detects pressure in the fuel vapor path under pressurization, as the fuel tank is a part of the fuel vapor path. If pressure in the fuel vapor path is below a threshold pressure, the leak check system determines that the fuel vapor treatment system has a leak. After the leak check, the fuel vapor path is connected with the atmosphere to release pressure therein.

However, the pressure sensor is exposed to the fuel vapor, since it is disposed in the fuel tank or in the pipes where the fuel vapor forms or flows. Therefore, the pressure sensor needs be resistant to the fuel vapor to prevent corrosion, increasing the cost of the pressure sensor.

On the other hand, if the pressure sensor is attached to the fuel tank or the pipe, a connection between the pressure sensor and the fuel tank or the pipe needs some extra work to prevent a leak of the fuel vapor from the connection. As a result, installation cost of the pressure sensor is increased.

SUMMARY OF THE INVENTION

It is therefore an object of the present invention to provide an improved pressure-changing device in which a pressure sensor is protected from fuel vapor.

It is another object of the present invention to provide an improved pressure-changing device in which a pressure sensor is easy to install.

It is another object of the present invention to provide an improved pressure-changing device that detects pressure in a fuel vapor path without being affected by foreign materials in a communicating path through which a pump communicates with an electromagnetic valve.

It is yet another object of the present invention to provide an improved pressure-changing device that detects pressure in a fuel vapor path without being affected by pressure of a flow that passes between a pump and an electromagnetic valve.

According to an aspect of the present invention, a pressure device, a pressure-changing device, has a pump, an electromagnetic valve, and a pressure sensor disposed in a communicating path through which the pump communicates with the electromagnetic valve. When the electromagnetic valve connects the pump with an adsorption vessel, the communicating path interconnects with a fuel vapor path including the adsorption vessel. Accordingly, pressure in the fuel vapor path is determined by detecting the pressure in the communicating path.

In the construction, the adsorption vessel is disposed between the electromagnetic valve and the fuel tank. In addition, in a case in which the leak check is operated by pressurizing the fuel vapor path, the communicating path is connected with the fuel vapor path by the electromagnetic valve only when the pump delivers air into the fuel vapor path via the communicating path. Therefore, little or no fuel vapor flows into the communicating path. Accordingly, exposure of the pressure sensor to the fuel vapor is minimized. Thus, the pressure sensor is protected from the fuel vapor.

According to another aspect of the present invention, the communicating path is formed in an airtight housing of the pressure-changing device. Therefore, air-tightness at a connection between the pressure sensor and the housing of the pressure device is ensured without requiring extra work. Accordingly, the pressure sensor is easily installed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE REFERRED EMBODIMENTS

The present invention will be described in detail with reference to embodiments.

First Embodiment

Figure 3A:
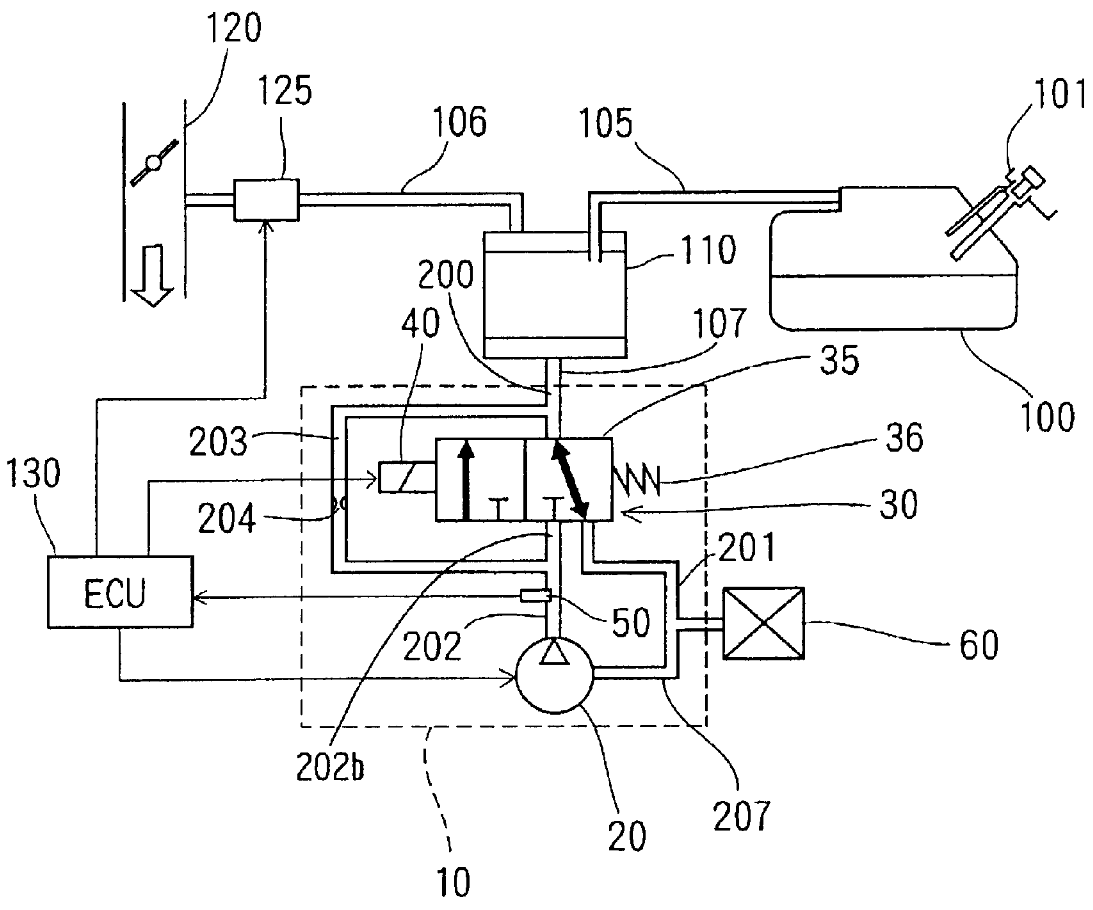
FIG. 3A is a structural view showing a leak check system that employs the pump module in a state in which the electromagnetic valve is closed according to the first embodiment of the present invention.
Figure 4A:
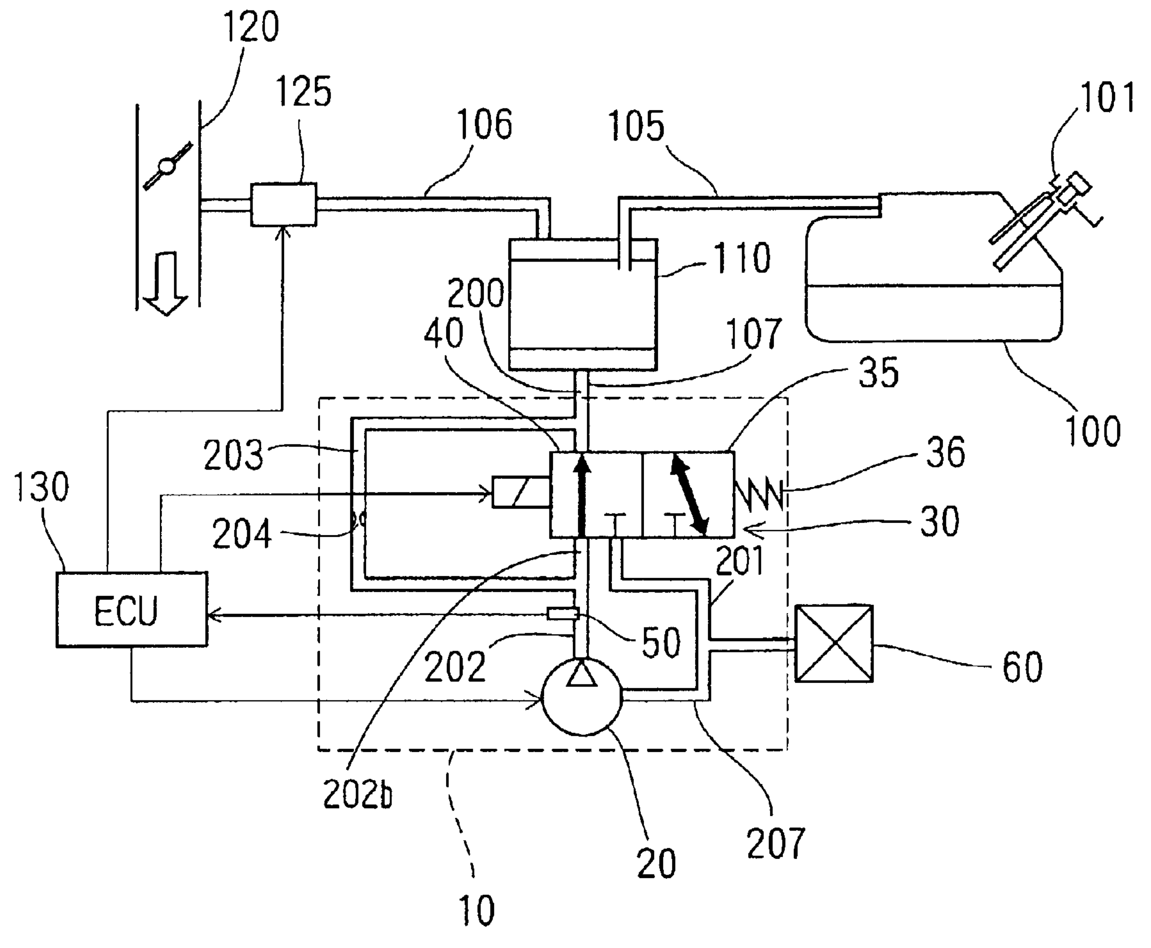
FIG. 4A is a structural view showing the leak check system that employs the pump module in a state in which the electromagnetic valve is opened according to the first embodiment of the present invention.

A leak check system according to the first embodiment of the present invention shown in FIGS. 3A and 4A is a pressure type leak check system. The pressure type leak check system comprises a pump module 10 as a pressure device, that is, a pressure-changing device, and an electronic control unit 130 as a means for controlling (the electronic control unit 130 is referred to as the ECU 130 hereafter). The leak check system checks leak in a fuel vapor treatment system shown in FIGS. 3A and 4A.

The fuel vapor treatment system adsorbs fuel vapor forming in a fuel tank 100 by adsorbent such as granulated active carbon contained in a canister 110, an adsorption vessel. The fuel vapor treatment system discharges the adsorbed fuel vapor into a suction pipe 120 by negative pressure in the suction pipe 120.

A pipe 105 connects the fuel tank 100 with the canister 110. A pipe 106 connects the canister 110 and the suction pipe 120. A pipe 107 connects the canister 110 and the pump module 10. The fuel tank 100, the pipes 105, 106, 107 and the canister 110 form a fuel vapor path. Fuel is filled into the fuel tank 100 through a fuel inlet 101.

The canister 110 communicates with a pump 20 or the atmosphere according to the switching of an electromagnetic valve 30 of the pump module 10.

A purge valve 125 in the pipe 106 is an electromagnetic valve, which closes when no current is supplied thereto and opens when current is supplied thereto. When the purge valve 125 opens, the fuel vapor adsorbed in the canister 110 is pulled into the suction pipe 120 by negative pressure.

Figure 7:
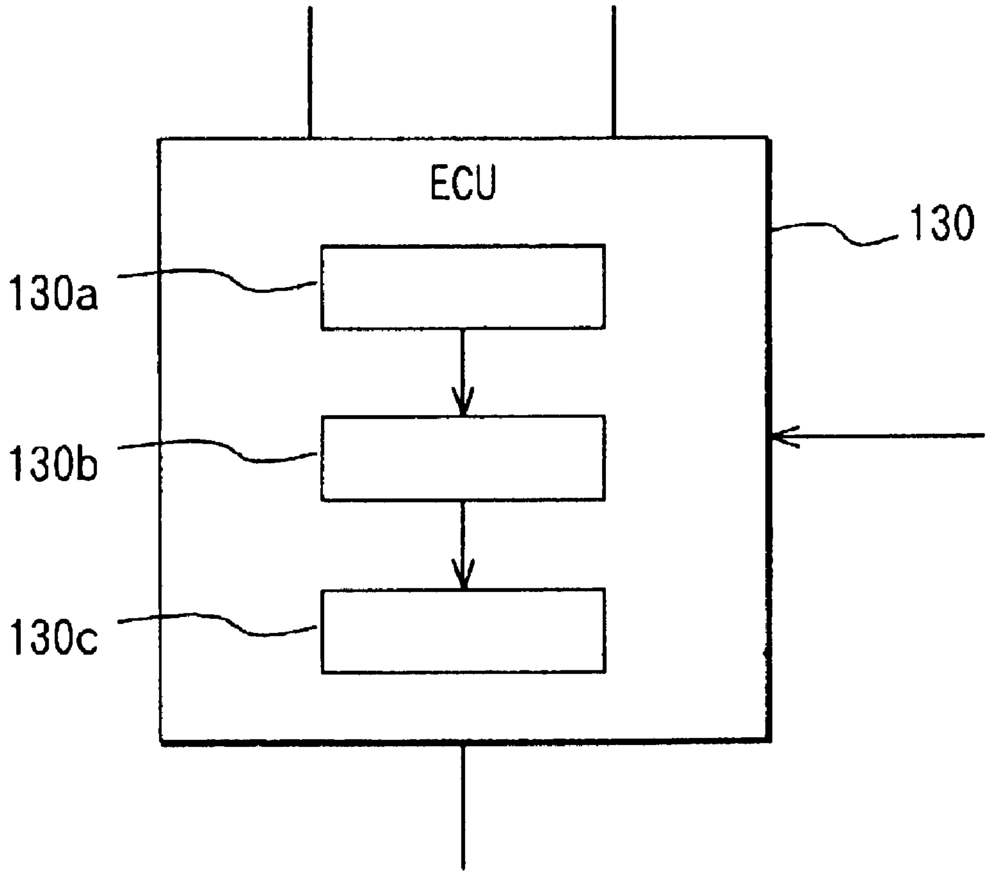
FIG. 7 is a schematic block diagram of an electronic control unit according to the first and second embodiments of the present invention.

The ECU 130 shown in FIG. 7 comprises a central processing unit (CPU), a read only memory (ROM), an input-output interface and the like. The ECU 130 controls the pump 20, the electromagnetic valve 30 and the purge valve 125 by the CPU executing control programs stored in the ROM.

The ECU 130 works as three functional means. The first functional means of the ECU 130 is a fuel vapor controlling means 130*a*, which controls a normal operation of the fuel vapor treatment system. The second functional means of the ECU 130 is a calibration means 130*b*, which performs a calibration of the pressure-changing device. The third functional means of the ECU 130 is a leak checking means 130*c*, which performs a leak check of the fuel vapor treatment system.

The system of the pump module 10 is explained below.

Figure 1:
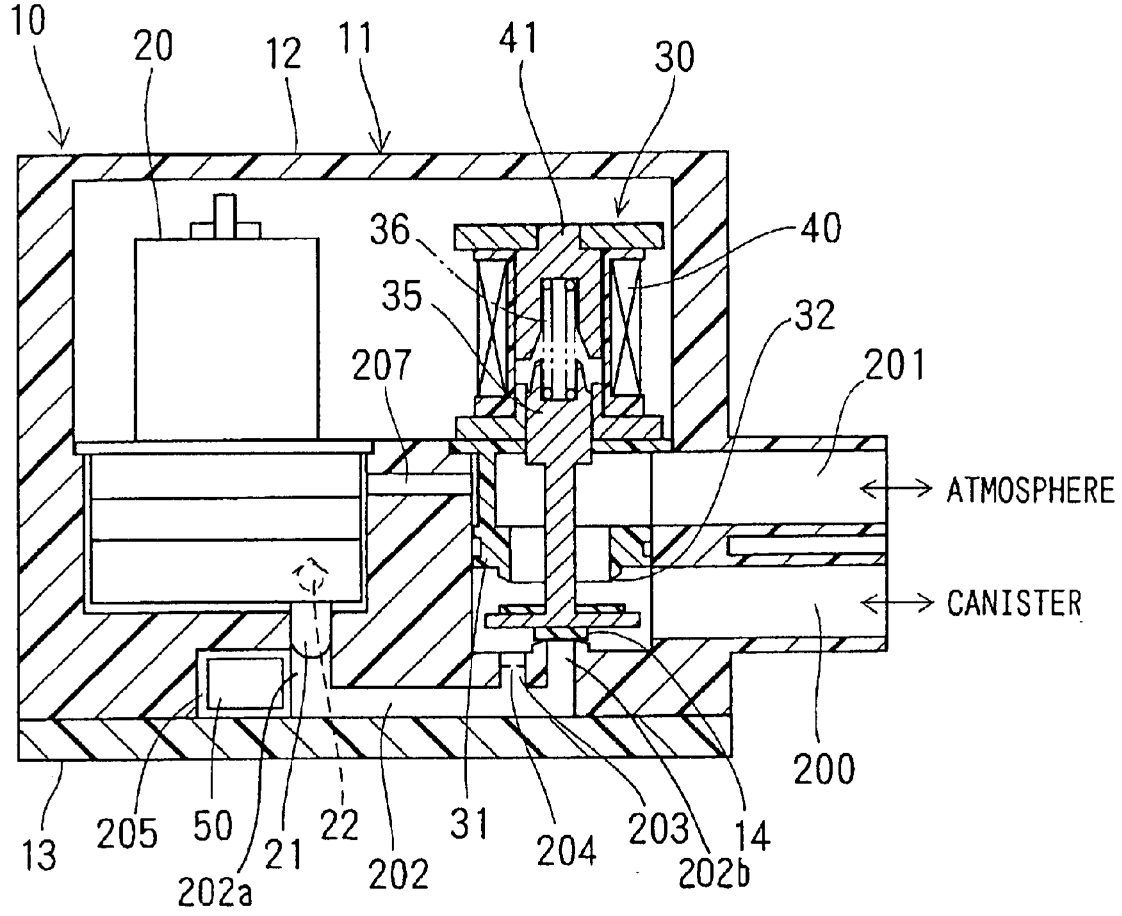
FIG. 1 is a schematic sectional view showing a pump module when an electromagnetic valve is closed according to a first embodiment of the present invention.
Figure 2:
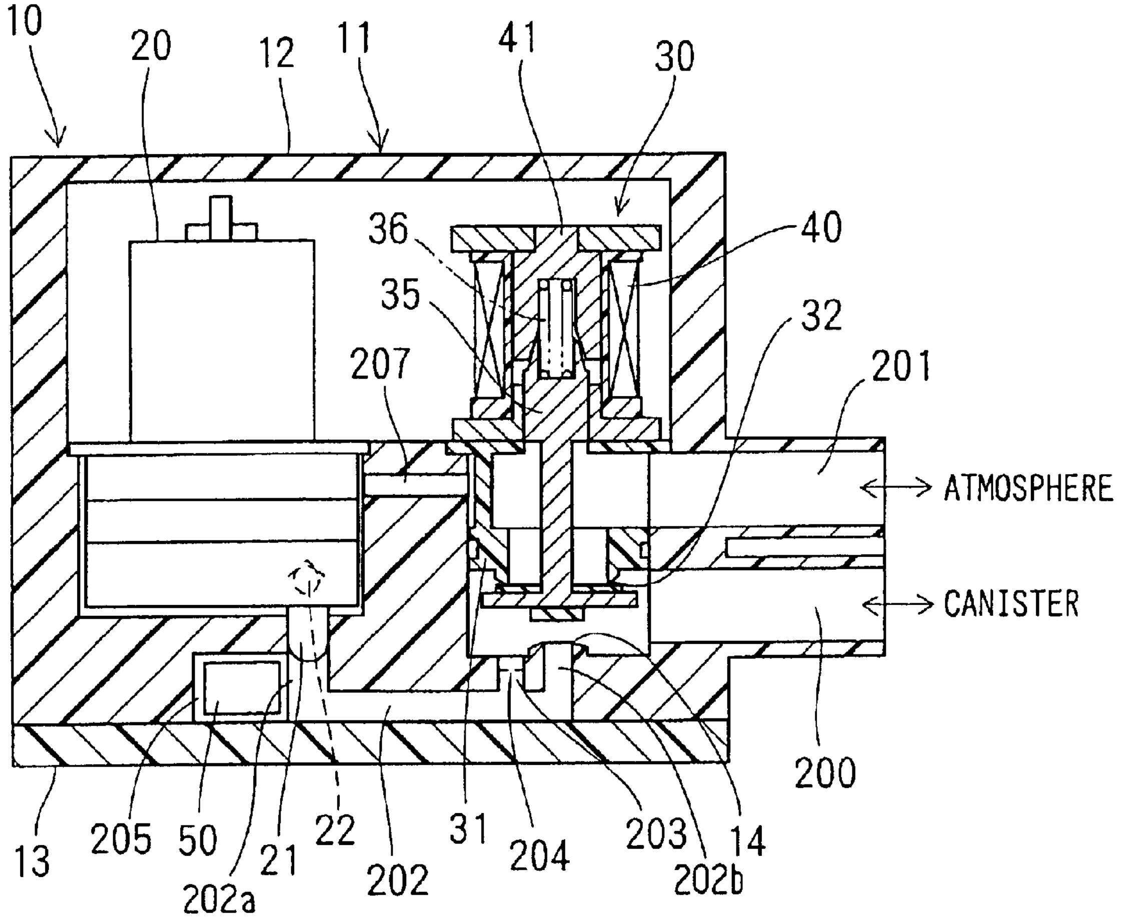
FIG. 2 is a schematic sectional view showing the pump module when the electromagnetic valve is opened according to the first embodiment of the present invention.

A housing 11 of the pump module 10 is made of plastic and has a first housing 12 and a second housing 13 as shown in FIGS. 1 and 2. The first housing 12 and the second housing 13 are connected with each other air-tightly by adhesion or welding. The first housing 12 is formed with a canister opening 200 and an atmosphere opening 201. The canister opening 200 communicates with the canister 110 through the pipe 107. The atmosphere opening 201 communicates with a filter 60 as shown in FIGS. 3A and 4A.

The pump module 10 comprises the pump 20 and the electromagnetic valve 30 as a means for switching. The pump 20 pulls air from the filter 60 through the atmosphere opening 201 and a path 207 when current is supplied to a motor of the pump 20. The atmosphere opening 201 communicates with the path 207 continuously. The pump 20 delivers air to the canister 110 through a pipe 21, a communicating path 202 and the canister opening 200. A check valve 22 is disposed in the pump 20 to prevent a back flow of air from the communicating path 202 to the path 207.

A restrictor path 203 branches from the communicating path 202 and communicates with the canister opening 200 continuously. A restrictor 204 is formed in the restrictor path 203. The restrictor 204 is used to measure a reference pressure for a leak check of the fuel vapor treatment system. The diameter of the restrictor 204 is set to about 0.5 mm for instance. A first vertical part 202*a* and a second vertical part 202*b* of the communicating path 202, the restrictor path 203 and side walls of a pressure chamber 205 are formed vertically to the bottom surface of the first housing 12 as shown in FIGS. 1 and 2.

The pressure chamber 205 communicates with the communicating path 202 between the pipe 21 and the branching point of the restrictor path 203. The pressure chamber 205 is formed in a peripheral space of the communicating path 202. The pressure chamber 205 is deviated from the airflow that is discharged by the pump 20 and passes through the communicating path 202.

Figure 5A:
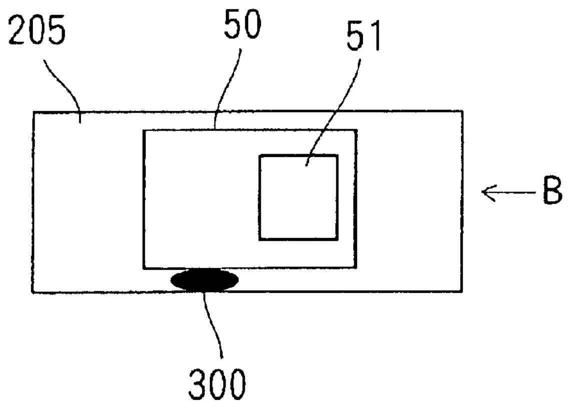
FIG. 5A is a schematic longitudinal sectional view showing a location of a pressure sensor in a pressure chamber according to the first and second embodiments of the present invention.
Figure 5B:
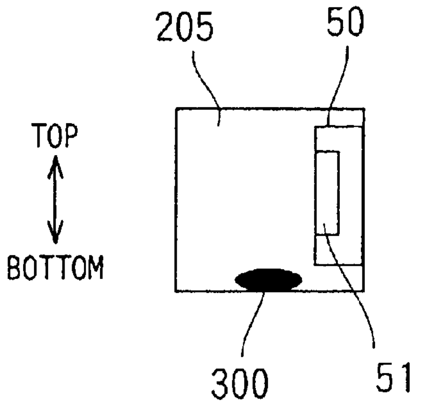
FIG. 5B is a schematic sectional view showing the location of the pressure sensor in the pressure chamber according to the first and second embodiments of the present invention.

A pressure sensor 50 is attached by adhesion and the like to a side wall of the pressure chamber 205 as shown in FIGS. 5A and 5B. The pressure sensor 50 is an absolute pressure sensor of which back pressure is a vacuum.

A pressure detection part 51 of the pressure sensor 50 is directed horizontally and receives pressure in the pressure chamber 205 horizontally. Pressure in the pressure chamber 205 equals pressure in the communicating path 202.

Figure 6A:
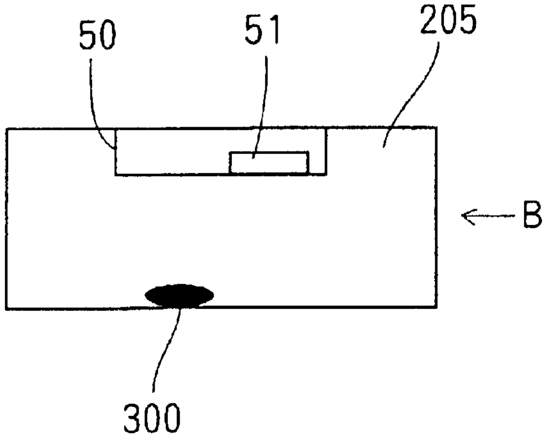
FIG. 6A is a schematic longitudinal sectional view showing a location of a pressure sensor in a pressure chamber according to a modification of the present invention.
Figure 6B:
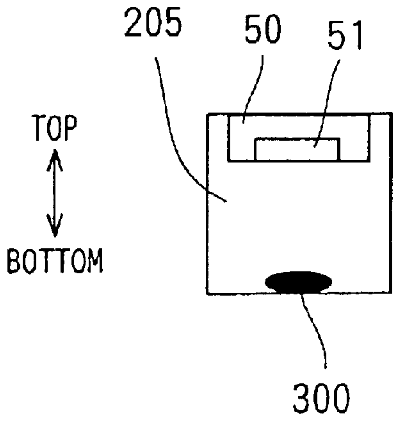
FIG. 6B is a schematic sectional view showing the location of the pressure sensor in the pressure chamber according to the modification of the present invention.

The pressure sensor 50 may be disposed on the upper wall of the pressure chamber 205 as shown in FIGS. 6A and 6B instead of being disposed on the side wall as shown in FIGS. 5A and 5B. In FIGS. 6A and 6B, the pressure detection part 51 of the pressure sensor 50 is directed vertically downward. Therefore, the pressure detection part 51 receives pressure in the pressure chamber 205 in a vertically down-to-up direction.

In both cases shown in FIGS. 5A and 5B and in FIGS. 6A and 6B, foreign materials 300 such as dust or water entering the pressure chamber 205 are prevented from depositing on the pressure detection part 51.

The electromagnetic valve 30 comprises a path member 31, a valve member 35, a spring 36, a coil 40 and a stator core 41. As shown in FIGS. 1 and 2, a valve seat 14 is formed on the first housing 12, and a valve seat 32 is formed on the path member 31. A part of the valve member 35 facing the stator core 41 is made of a magnetic material.

The spring 36 biases the valve member 35 toward the valve seat 14. When no current is supplied to the coil 40, the valve member 35 contacts the valve seat 14 due to a biasing force of the spring 36. When current is supplied to the coil 40, the magnetic part of the valve member 35 is attracted toward the stator core 41 against the biasing force of the spring 36. As a result, the valve member 35 separates from the valve seat 14 and contacts the valve seat 32.

The electromagnetic valve 30 is regarded as closed when the valve member 35 contacts the valve seat 14 as shown in FIGS. 1 and 3A. Conversely, the electromagnetic valve 30 is regarded as opened when the valve member 35 contacts the valve seat 32 as shown in FIGS. 2 and 4A.

When the electromagnetic valve 30 is closed as shown in FIGS. 1 and 3A, a communication between the canister opening 200 and the second vertical part 202*b* of the communicating path 202 is cut off. However, the communicating path 202 retains a communication with the canister opening 200 and the atmosphere opening 201 through the restrictor path 203 alone. At this time, the canister opening 200 communicates with the atmosphere opening 201.

An area of a path provided by the communication between the canister opening 200 and the atmosphere opening 201 is much larger than that provided by the restrictor 204. In addition, the pump 20 has the check valve 22 to prevent a back flow of air. Therefore, little or no fluid passes between the communicating path 202 and the canister opening 200 or the atmosphere opening 201 while the electromagnetic valve 30 is closed as shown in FIGS. 1 and 3A, and the pump 20 is not operated.

When the electromagnetic valve 30 is opened as shown in FIGS. 2 and 4A, the canister opening 200 communicates with the communicating path 202 through the second vertical part 202*b*. Meanwhile, the communication between the canister opening 200 and the atmosphere opening 201 is cut off.

The operations of the fuel vapor treatment system and the pressure type leak check system will be explained below.

1.1 Normal Operation:

In a normal operation of the fuel vapor treatment system, the fuel vapor controlling means 130*a* closes the electromagnetic valve 30 as shown in FIGS. 1 and 3A, and closes the purge valve 125. Accordingly, the canister 110 communicates with the atmosphere through the electromagnetic valve 30. Fuel vapor forming in the fuel tank 100 passes through the pipe 105 and is adsorbed in the canister 110.

When the fuel vapor adsorbed in the canister 110 is to be discharged into the suction pipe 120, the fuel vapor controlling means 130*a* opens the purge valve 125 in the state shown in FIGS. 1 and 3A. The adsorbed fuel vapor is pulled into the suction pipe 120 by negative pressure, for a suction pipe 120 side of the canister 110 communicates with the atmosphere via the pipe 107 and the electromagnetic valve 30.

1.2 Calibration:

In a calibration of the pressure device, the calibration means 130*b* determines a reference pressure with the restrictor 204 and memorizes the reference pressure for the leak check of the fuel vapor treatment system.

The calibration means 130*b* closes the electromagnetic valve 30 as shown in FIGS. 1 and 3A, and closes the purge valve 125. Then, the calibration means 130*b* turns on the pump 20. Accordingly, pressure in the communicating path 202 increases because the air discharged by the pump 20 passes through the restrictor 204 alone.

After that, the pressure sensor 50 detects pressure in the pressure chamber 205 and transmits pressure signals to the calibration means 130*b*. The calibration means 130*b* determines pressure in the communicating path 202 by the pressure signals. The calibration means 130*b* stores the value of the pressure in the communicating path 202 as the reference pressure.

The reference pressure is regarded as the same as a pressure in the fuel vapor path in a state in which the fuel vapor path has a hole with the same opening area as the restrictor 204 and is pressurized by the pump 20.

1.3 Leak Check:

The leak checking means 130*c* performs a leak check of the fuel vapor treatment system after the calibration processing 1.2.

In the leak check, the leak checking means 130*c* determines a threshold pressure by the reference pressure determined in the calibration processing 1.2.

The leak checking means 130*c* opens the electromagnetic valve 30 and closes the purge valve 125 as shown in FIGS. 2 and 4A. Accordingly, the communication between the canister 110 and the atmosphere is cut off, and the canister 110 is connected with the pump 20 through the second vertical part 202*b* of the communicating path 202.

Then, the leak checking means 130*c* turns on the pump 20 to deliver air to the canister 110, the pipes 105 and 106, and the fuel tank 100 through the communicating path 202, the canister opening 200 and the pipe 107. Thus, the pump 20 pressurizes the fuel vapor path.

After that, the pressure sensor 50 detects pressure in the pressure chamber 205 and transmits pressure signals to the leak checking means 130C. The leak checking means 130*c* determines a pressure in the communicating path, a pressure in the fuel vapor path, by the pressure signals.

The leak checking means 130*c* judges the existence of leak in the fuel vapor treatment system by comparing the pressure detected in the leak check with the threshold pressure.

If the leak checking means 130*c* concludes that pressure in the fuel vapor path rises to the threshold pressure and that there is no leak, the leak checking means 130*c* turns off the pump 20 and closes the electromagnetic valve 30. Thus, the canister 110 is connected with the atmosphere, releasing pressure in the fuel vapor path.

Conversely, If the leak checking means 130*c* concludes that the fuel vapor treatment system has leak, the amount of the leak may also be determined.

In the first embodiment, the canister 110 is disposed between the electromagnetic valve 30 and the fuel tank 100. In addition, the canister opening 200 communicates with the communicating path 202 through the second vertical part 202*b*, not through the restrictor path 203 alone, when the pump 20 discharges air to perform the leak check of the fuel vapor treatment system. At this time, the pump 20 delivers air introduced through the filter 60 to the communicating path 202.

Accordingly, exposure of the pressure sensor 50, which is disposed in the pressure chamber 205 communicating with the communicating path 202, to the fuel vapor is minimized. Thus, the pressure sensor 50 is protected from the vapor fuel. Therefore, a pressure sensor without resistance to the fuel vapor may be applicable as the pressure sensor 50, contributing to the cost reduction.

Second Embodiment

Figure 3B:
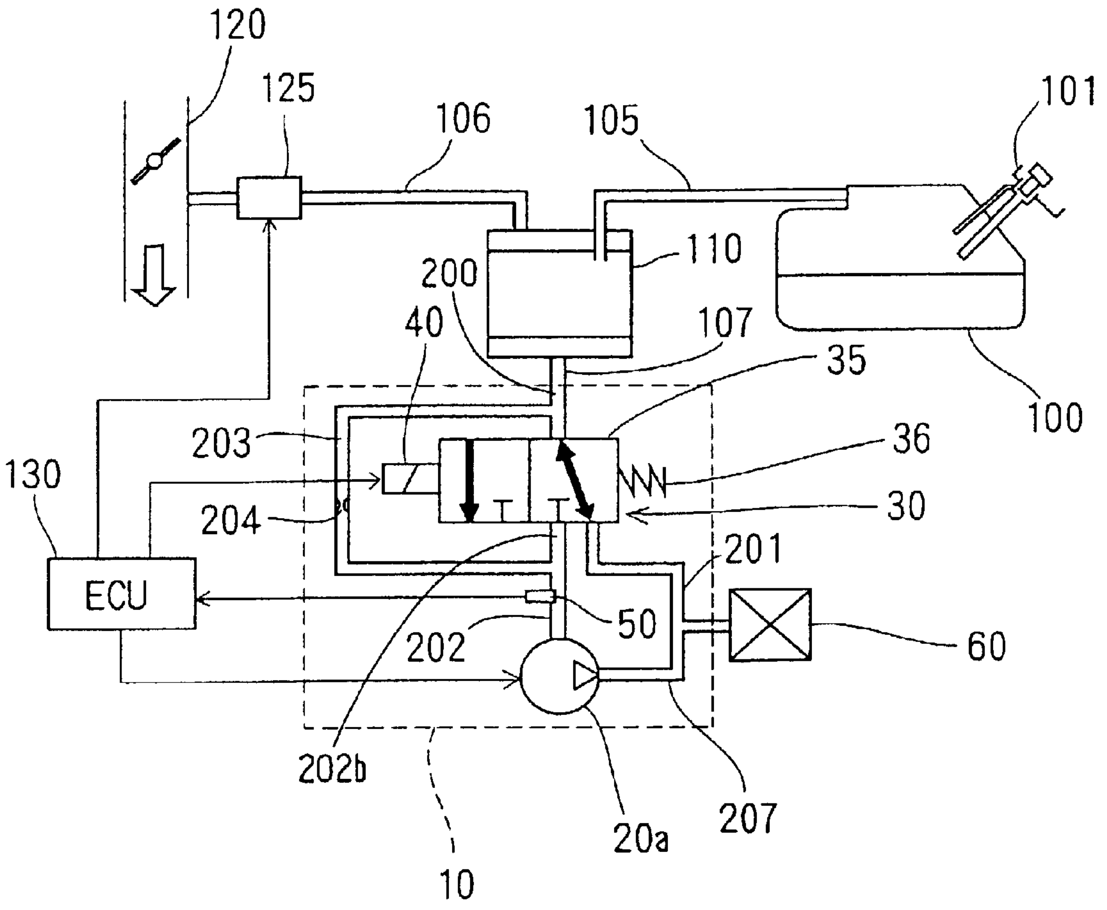
FIG. 3B is a structural view showing a leak check system that employs a pump module in a state in which an electromagnetic valve is closed according to a second embodiment of the present invention.
Figure 4B:
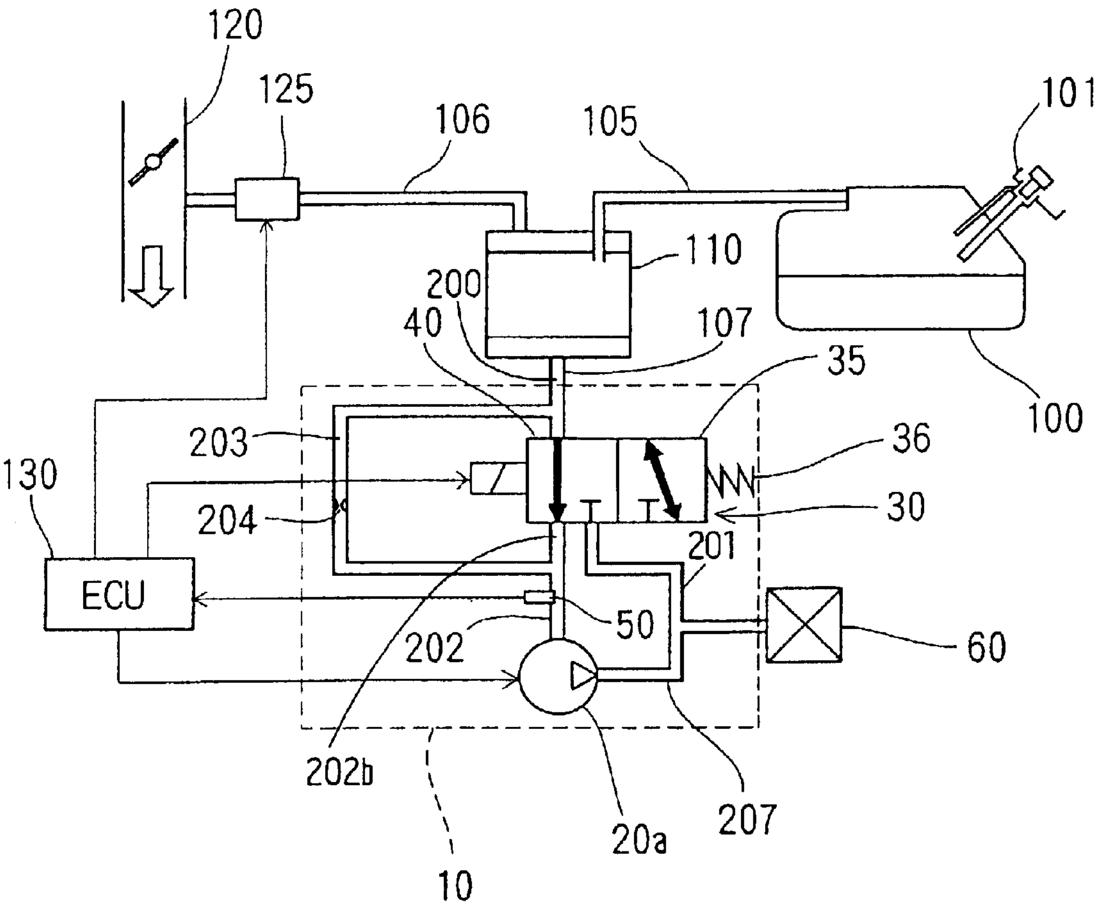
FIG. 4B is a structural view showing the leak check system that employs the pump module in a state in which the electromagnetic valve is opened according to the second embodiment of the present invention.

A leak check system according to the second embodiment of the present invention shown in FIGS. 3B and 4B is a pressure reducing type leak check system. The leak check system comprises a pump module 10 as a pressure reducing device, a pressure-changing device, and an electronic control unit 130 as a means for controlling. The leak check system checks leak in a fuel vapor treatment system shown in FIGS. 3B and 4B. The leak check system according to the second embodiment has the construction similar to the first embodiment except that a pump 20*a* delivers air in a direction opposite to the direction in which the pump 20 in the first embodiment delivers air. In order to reverse the pumping direction, the pump 20*a* in the second embodiment has the check valve 22 in an opposite direction. The pump module 10 comprises a pump 20*a* and an electromagnetic valve 30 as a means for switching. The pump 20*a* pulls gas from the fuel vapor path through a canister opening 200 and a communicating path 202 and discharges the gas to a filter 60 through a path 207 and an atmosphere opening 201 when current is supplied to a motor of the pump 20*a*.

The operations of the fuel vapor treatment system and the pressure reducing type leak check system will be explained below.

2.1 Normal Operation:

In a normal operation of the fuel vapor treatment system, the fuel vapor controlling means 130*a* in the second embodiment controls the electromagnetic valve 30 and the purge valve 125 in the same way as the first embodiment.

2.2 Calibration:

In a calibration of the pressure reducing device, the calibration means 130*b* determines a reference pressure with the restrictor 204 and memorizes the reference pressure for the leak check of the fuel vapor treatment system.

The calibration means 130*b* closes the electromagnetic valve 30 as shown in FIG. 3B, and closes the purge valve 125. Then, the calibration means 130*b* turns on the pump 20*a*. Accordingly, pressure in the communicating path 202 decreases because the gas pulled by the pump 20*a* passes through the restrictor 204 alone.

After that, the pressure sensor 50 detects pressure in the pressure chamber 205 and transmits pressure signals to the calibration means 130*b*. The calibration means 130*b* determines pressure in the communicating path 202 by the pressure signals. The calibration means 130*b* stores the value of the pressure in the communicating path 202 as the reference pressure.

The reference pressure is regarded as the same as a pressure in the fuel vapor path in a state in which the fuel vapor path has a hole with the same opening area as the restrictor 204 and is depressurized by the pump 20*a*.

2.3 Leak Check:

The leak checking means 130*c* performs a leak check of the fuel vapor treatment system after the calibration processing 2.2.

In the leak check, the leak checking means 130*c* determines a threshold pressure by the reference pressure determined in the calibration processing 2.2.

The leak checking means 130*c* opens the electromagnetic valve 30 and closes the purge valve 125 as shown in FIG. 4B. Accordingly, the communication between the canister 110 and the atmosphere is cut off, and the canister 110 is connected with the pump 20*a* through the second vertical part 202*b* of the communicating path 202.

Then, the leak checking means 130*c* turns on the pump 20*a* to pull gas from the canister 110, the pipes 105, 106 and the fuel tank 100 through the communicating path 202, the canister opening 200 and the pipe 107. Thus, the pump 20*a* reduces pressure in the fuel vapor path.

After that, the pressure sensor 50 detects pressure in the pressure chamber 205 and transmits pressure signals to the leak checking means 130C. The leak checking means 130*c* determines a pressure in the communicating path 202, a pressure in the fuel vapor path, by the pressure signals.

The leak checking means 130*c* judges the existence of leak in the fuel vapor treatment system by comparing the pressure detected in the leak check with the threshold pressure.

If the leak checking means 130*c* concludes that pressure in the fuel vapor path falls to the threshold pressure and that there is no leak, the leak checking means 130*c* turns off the pump 20*a* and closes the electromagnetic valve 30. Thus, the canister 110 is connected with the atmosphere, restoring pressure in the fuel vapor path.

Conversely, If the leak checking means 130*c* concludes that the fuel vapor treatment system has leak, the amount of the leak may also be determined.

In the second embodiment, the canister 110 is disposed between the electromagnetic valve 30 and the fuel tank 100. Therefore, exposure of the pressure sensor 50 to the fuel vapor is inhibited.

In the above embodiments, when the pump 20 and the pump 20*a* are not operated, pressure in the communicating path 202 and the pressure chamber 205 are at atmospheric pressure. Therefore, the pressure sensor 50 is able to detect atmospheric pressure.

In the above embodiments, the pressure sensor 50 is disposed on the side wall or the upper wall of the pressure chamber 205 so that the pressure detection part 51 receives pressure in a horizontal direction or in a vertically down-to-up direction.

Therefore, foreign materials 300 do not deposit on the pressure detection part 51. The pressure sensor 50 is able to detect pressure in the pressure chamber 205 precisely, because it receives no weight of the foreign materials 300.

Alternatively, the pressure sensor 50 may be disposed wherever the pressure detection part 51 receives pressure in a direction between a horizontal direction and a vertically down-to-up direction.

In the above embodiments, the pressure detection part 51 does not receive pressure of the flow discharged by the pump 20 or the flow pulled by the pump 20*a*, since the pressure sensor 50 is disposed in the pressure chamber 205 formed in a space deviated from the flow.

Accordingly, the pressure sensor 50 is able to detect pressure in the communicating path 202 and in the fuel vapor path precisely.

Alternatively, the pressure sensor 50 may be disposed directly in the communicating path 202, not in the pressure chamber 205. The pressure sensor 50 preferably should be disposed so that the pressure detection part 51 faces between the direction of the flow passing through the communicating path 202 and the direction perpendicular to the flow. Thus, the pressure detection part 51 is prevented from receiving pressure of the flow passing through the communicating path 202 and is able to precisely detect the pressure in the communicating path 202 and in the fuel vapor path.

In the above embodiments, the pressure-changing device, that is, the pressure device or the pressure reducing device, is modularized by disposing the pump 20, the pump 20*a*, the electromagnetic valve 30 and the pressure sensor 50 in the air-tight housing 11. Therefore, a connector formed on the housing 11 is used to supply electricity to the pump 20, the pump 20*a* and the electromagnetic valve 30 and to transmit the pressure signals detected by the pressure sensor 50.

Accordingly, the connector is wired easily, and the factor of developing the leak of the fuel vapor from the connector is minimized. In addition, installation of a pipe to connect the pump 20 and the pump 20*a* with the electromagnetic valve 30 is not needed. Moreover, the connection between the pressure sensor 50 and the housing 11 is ensured to be air-tight without requiring extra works. Therefore, the pressure sensor 50 is easily installed.

Alternatively, the pressure-changing device may not be modularized and the pump 20 and the pump 20*a* may be connected with the electromagnetic valve 30 by a pipe in which the pressure sensor 50 may be disposed.

In the above embodiments, the pressure sensor 50 is an absolute pressure sensor of which back pressure is a vacuum. Therefore, the housing 11 need not be formed with a path to introduce atmospheric pressure to the pressure sensor 50.

Alternatively, a differential pressure sensor, which measures pressure relative to atmospheric pressure, may be used as the pressure sensor 50.

In the above embodiments, the first vertical part 202*a* and the second vertical part 202*b* of the communicating path 202, the restrictor path 203 and the side walls of the pressure chamber 205 are formed vertically to the bottom surface of the first housing 12.

Therefore, it is easy to die-cut the communicating path 202, the restrictor path 203 and the pressure chamber 205 in the first housing 12.

In addition, the communicating-path 202, the restrictor path 203 and the path 207 are formed in the first housing 12 which is airtight. Therefore, air-tightness of the communicating path 202, the restrictor path 203 and the path 207 are ensured.

In the above embodiments, the restrictor 204 for determining the reference pressure is formed in the restrictor path 203 branching from the communicating path 202.

Alternatively, a construction without the restrictor path 203, wherein the reference pressure is not detected, may be applied.

The present invention should not be limited to the disclosed embodiment, but may be implemented in many other ways without departing from the spirit of the invention.

What is claimed is:

1. A pressure-changing device for a leak check system to check for leaks in a fuel vapor treatment system, which adsorbs fuel vapor forming in a fuel tank by adsorbent in an adsorption vessel and discharges the adsorbed fuel vapor into a suction pipe, by changing pressure in a fuel vapor path through which fuel vapor passes in the fuel vapor treatment system, the pressure-changing device comprising:

a pump that changes pressure in the fuel vapor path;

an electromagnetic valve that is disposed between the fuel vapor path and the pump and provides a communication between the fuel vapor path and the pump and a communication between the fuel vapor path and the atmosphere;

a pressure sensor that is disposed in a communicating path through which the pump communicates with the electro-magnetic valve and detects pressure in the communicating path; and a restrictor path that as a restrictor and branches from the communicating path, the restrictor path continuously communicating the communicating path with the absorbent vessel.

2. The pressure-changing device as in claim 1, wherein the pump, the electromagnetic valve and the pressure sensor are disposed in an air-tight housing.

3. The pressure-changing device as in claim 1, wherein the pressure sensor is disposed in a place where a pressure detection part of the pressure sensor receives pressure in the communicating path in a direction between a horizontal direction and a vertically down-to-up direction.

4. The pressure-changing device as in claim 1, wherein the pressure sensor is disposed in a place where a pressure detection part of the pressure sensor faces between a direction of a flow passing through the communicating path and a direction perpendicular to the direction of the flow.

5. The pressure-changing device as in claim 1, wherein the communicating path is formed with a pressure chamber that is formed in a space deviated from a flow passing through the communicating path and communicates with the communicating path, the pressure chamber housing the pressure sensor.

6. The pressure-changing device as in claim 1, wherein the pressure sensor is an absolute pressure sensor.

7. A pressure-changing device for a leak check system to check for leaks in a fuel vapor treatment system, which adsorbs fuel vapor forming in a fuel tank by adsorbent in an adsorption vessel and discharges the adsorbed fuel vapor into a suction pipe, by changing pressure in a fuel vapor path through which fuel vapor passes in the fuel vapor treatment system, the pressure-changing device comprising:

a pump that changes pressure in the fuel vapor path;

an electromagnetic valve that is disposed between the fuel vapor path and the pump and provides a communication between the fuel vapor path and the pump and a communication between the fuel vapor path and the atmosphere;

a pressure sensor that is disposed in a communicating path through which the pump communicates with the electro-magnetic valve and detects pressure in the communicating path;

a restrictor path that as a restrictor and branches from the communicating path; and a calibration means for performing a calibration of the pressure-changing device by memorizing a pressure in the communicating path as a reference pressure in a state in which the electromagnetic valve cuts off the communication between the fuel vapor path and the pump and the pump changes pressure in the communicating path.

8. The pressure-changing device as in claim 7, further comprising a leak checking means for performing a leak check of the fuel treatment system by comparing a pressure in the communicating path with a threshold pressure determined by the reference pressure in a state in which the electromagnetic valve provides the communication between the fuel vapor path and the pump, the fuel vapor path communicates with the pump alone, and the pump changes pressure in the fuel vapor path.

9. The pressure-changing device as in claim 1, further comprising a leak checking means for performing a leak check of the fuel treatment system by comparing a pressure in the communicating path with a threshold pressure value in a state in which the electromagnetic valve provides the communication between the fuel vapor path and the pump, the fuel vapor path communicates with the pump alone, and the pump changes pressure in the fuel vapor path.

10. The pressure-changing device as in claim 1, wherein the leak check system is a pressure type leak check system and the electro-magnetic valve cuts off the communication between the fuel vapor path and the pump when the pump is not operated.

11. The pressure-changing device as in claim 1, wherein the adsorption vessel is disposed between the fuel tank and the electromagnetic valve.

12. A pressure-changing device for a leak check system to check for leaks in a fuel vapor treatment system, which adsorbs fuel vapor forming in a fuel tank by adsorbent in an adsorption vessel and discharges the adsorbed fuel vapor into a suction pipe, by changing pressure in a fuel vapor path through which fuel vapor passes in the fuel vapor treatment system, the pressure-changing device comprising:

a pump that changes pressure in the fuel vapor path;

an electromagnetic valve that is disposed between the fuel vapor path and the pump and provides a communication between the fuel vapor path and the pump and a communication between the fuel vapor path and the atmosphere; and a pressure sensor that is disposed in a communicating path through which the pump communicates with the electro-magnetic valve and detects pressure in the communicating path;

wherein the communicating path is formed with a pressure chamber that is formed in a space deviated from a flow passing through the communicating path and communicates with the communicating path, the pressure chamber housing the pressure sensor, and wherein a pressure detection part of the pressure sensor is directed horizontally and receives pressure in the press chamber horizontally, and wherein pressure in the pressure chamber equals pressure in the communicating path.

13. A pressure-changing device for a leak check system to check for leaks in a fuel vapor treatment system, which adsorbs fuel vapor forming in a fuel tank by adsorbent in an adsorotion vessel and discharges the adsorbed fuel vapor into a suction pipe, by changing pressure in a fuel vapor path through which fuel vapor passes in the fuel vapor treatment system, the pressure-changing device comprising:

a pump that changes pressure in the fuel vapor path;

an electromagnetic valve that is disposed between the fuel vapor path and the pump and provides a communication between the fuel vapor path and the pump and a communication between the fuel vapor path and the atmosphere; and a pressure sensor that is disposed in a communicating path through which the pump communicates with the electro-magnetic valve and detects pressure in the communicating path;

wherein the communicating path is formed with a pressure chamber that is formed in a space deviated from a flow passing throuah the communicating path and communicates with the communicating path, the pressure chamber housing the pressure sensor, and wherein the pressure sensor is disposed on an upper wall of the pressure chamber and a pressure detection part of the pressure sensor is directed vertically downward to receive pressure in the pressure chamber in a vertically down-to-up direction.

* * * * *